United States Patent Office 3,042,623
Patented July 3, 1962

3,042,623
SYNTHETIC DETERGENTS AND SURFACE-ACTIVE AGENTS
David H. Greene, Long Beach, Calif., assignor to Universal Detergents, Inc., Fort Worth, Tex., a corporation of Delaware
No Drawing. Filed Aug. 24, 1959, Ser. No. 835,417
7 Claims. (Cl. 252—137)

This invention relates to an economical formulated cleaning compound comprising a combination of ingredients, said ingredients cooperating to produce material alterations in the properties of certain other ingredients whereby the formulated cleaning compound has novel characteristics adapting it to efficient use in a great variety of cleaning applications. The present invention is an improvement over the inventions described and claimed in my copending application Serial No. 524,300, filed July 25, 1955, now abandoned.

As is well known, a multipurpose cleansing agent that might be employed in concentrated or dilute aqueous form for a wide variety of cleaning purposes has long been desired. However, cleaning compositions, detergents and other such surface-active agents used heretofore have generally been limited in their usefulness to a particular field or area of activity. Thus, a detergent composition exhibiting good properties as a dishwashing compound is generally of little use, for example, in dip-tank stripping or related operations, and may even be unsuited to analogous laundry use. Similarly, a composition useful as a household cleaner or metal cleaning composition may prove unsatisfactory in laundry or kitchen applications, and so on. The product of the present invention has many fields of use and does not contain nonaqueous solvents or petroleum hydrocarbons.

A particular object of the present invention, therefore, is to provide a surface-active formulated composition that is characterized by enhanced cleaning and detergent properties in a wide variety of applications. For example, the compositions prepared in accordance with this invention have been found to be excellent surface cleaners and detergents when used in the washing of automobiles, dishes, fabrics and clothing; they are splended cleansers for glass and woodwork; they may be used in the burnishing of small metal parts, and as a vehicle in polishing, grinding and cutting compounds where they act as coolant, suspending agent and cleaner combined; they are effective as cleaners for upholstery and rugs; they have even been used to de-tin steel at normal temperatures.

Another property highly to be desired but heretofore unobtained in most cleansers and detergents of the prior art is a capacity to exist as a very concentrated yet low viscosity aqueous solution. For example, a particularly effective group of surface-active agents, the sulfonated alkyl benzenes, and especially the sodium salt of dodecyl benzene sulfonate, will form free-flowing solutions at room temperatures only at concentrations of below about 2% or 3%, and generally tend to form clouds, gels, or pastes at various concentrations above about 2% to 10%. In my co-pending application, referred to above, there is disclosed a material for solubilizing detergents and surface-active agents of this general type that permits free-flowing aqueous solutions to be formed containing substantially increased amounts of such relatively insoluble surfactants. Despite the demonstrated effectiveness and usefulness of surface-active materials and solutions, as therein disclosed, they are nevertheless subject to a number of shortcomings.

(1) They are not always stable at temperatures below about 60° F. and may become unduly viscous or fail to provide desired properties at such temperatures.

(2) They are not always effective in hard water, such as prevails in most areas of the world.

(3) They may become sufficiently alkaline in liquid or solution form, in common with most surfactants, that their use must be avoided in certain applications, (e.g., the cleansing of "hand washables," such as woolens, silks, nylons, etc., or of painted or lacquered surfaces).

It is a further object of the invention therefore to provide a composition useful as a surface-active agent and detergent in dry or relatively concentrated liquid form that may be mixed with water to form stable, virtually neutral, free-flowing aqueous solutions.

Another object of the invention is to provide such a composition, having enhanced cleaning and detergent properties, that is also characterized by an outstanding water softening capacity as well as substantial non-alkalinity in solution, aqueous solutions of such composition being virtually neutral and having a pH rating of from about 7.5 to a little over 8 throughout an extreme range of dilutions.

A further object of this invention is to provide in dry or powder form surface-active agents or detergents which, although containing a substantial quantity of normally insoluble surfactants are capable of being readily dissolved to form solutions containing as much as 40% to 48% of solids at normal temperatures, and as high as 50% to 55% at higher temperatures.

A still further object of this invention is to provide liquified or dried products useful as detergents and surfactants which exhibit greatly reduced corrosive tendencies toward metals.

Additional objects and advantages of the present invention will be apparent from the following disclosure and from the specific examples enumerated therein.

The present invention is based on the discovery that aqueous solutions of a mixture comprising, on a dry weight basis, 40 to 55 parts by weight of the surface-active agents and detergents disclosed in my co-pending application, as referred to above, 30 to 38 parts of a water soluble polyphosphate, and 20 to 30 parts of an ammonium sulfate, possess enhanced superior cleansing and detergent properties and, in varying concentration, a versatility as a cleansing agent heretofore unknown to the art. The wide range of usefulness of these aqueous solutions is apparently due to three principal attributes of the mixture of ingredients: the presence of a good detergent surfactant as the "active" ingredient and a solubilizing agent therefor; very high sequestering and water-softening properties; and a substantially uniform, very mild alkalinity over a wide range of dilutions with water.

As is particularly disclosed in my co-pending application, Serial No. 524,300, it has been determined that large numbers of detergents and other surface-active agents which normally form pastes, gels, or cloud at a given concentration in liquid may be readily solubilized into free-flowing liquid solutions by mixing such agents with alkyl aryl sulfonates essentially comprising the alkali metal salts of sulfonated mixtures of alpha and beta methyl naphthalene, with or without dimethyl naphthalene. The preferred naphthalene mixture referred to is that having a boiling range between about 400° F. and 550° F.; it may be substantially free of olefins. Differently stated the above alkali salts of mixed naphthalenes may be said to be an alkali metal sulphonate of mixed hydrocarbons (preferably having an average molecular weight of between about 230 and 275). For convenience here, as in the aforementioned co-pending application, these alkyl aryl sulfonates in the form of alkali metal salts are hereinafter referred to as "AA." Usefulness of AA resides in its ability to form free-flowing solutions containing substantial amounts of the normally relatively insoluble alkyl aryl sulfonates, and particularly dodecyl benzene sulfonate (referred to herein as "DDBS"). As is noted in detail in my co-pending application, a wide variety of surface-active agents may be so solubilized, but DDBS is commonly used and normally from 3 to 6 parts by weight of DDBS is used with 4 to 7 parts by weight of AA.

In accordance with the present invention, it has been determined that when a water soluble polyphosphate and ammonium sulfate are together added to a surface-active mixture, prepared as above, a new surface-active composition is produced that is unusually effective and versatile as a cleansing agent. Moreover, it has been determined that the polyphosphate and ammonium sulfate together exert a cooperative effect as compared with their individual effects that provides the composition with a number of highly desirable properties. These are: ready solubility at all concentrations up to about 50 to 55% solids; excellent surface-active and detergent characteristics; very high sequestering and water-softening properties; and the formation of a complex mixture of salts having unusual buffering characteristics. As a result of these properties, the new compositions of the invention possess a mildness that permits them to be used in situations where the more alkaline liquid cleaners of the prior art must be avoided. In addition, as will appear, the new formulated compositions are characterized by enhanced cleaning and detergent properties in a wide variety of applications. Cooperation and inter-reaction between the ingredients of the formulated compositions is also indicated by the fact that only about 3.5–4.0% of sodium tripolyphosphate can be dissolved in a solution containing 20% to 30% of the base mixture of AA and DDBS. However, when 7% to 12% of ammonium sulfate is added to a solution containing 20% to 30% of the base mixture, then 10% to 15% of sodium tripolyphosphate can be incorporated and a stable concentrated solution obtained, which concentrate can now be diluted to any desired concentration of activity. The above and other interaction between the ingredients permits the formulated composition to exhibit detergent powers (on a surface-active content basis) two to three times as great as those normally obtained.

In formulating the new surface-active compositions of the invention, a base mixture of AA and other surfactant, such as DDBS, may be mixed as a dry powder with the other ingredients. The proportion of ammonium sulfate to water soluble polyphosphate making up the remainder of the final product is critical. Thus, it has been determined that the ammonium sulfate should be present in an amount between about 55% and 85% of the weight of the polyphosphate. If smaller amounts of ammonium sulfate are employed, it may be impossible for all the polyphosphates to go into the solution upon subsequently mixing the composition with water. For example, when no ammonium sulfate is present, aqueous solutions of AA and DDBS are capable of dissolving only about 3% to 4% by weight of polyphosphates. Mixing of the ingredients can be accomplished in a variety of useful ways. For example, they can be mixed as dried powders and then formed into solutions of desired concentrations by adding water, such solutions containing as much as 45% to 55% of solids; or slurries or solutions can be formed employing certain of the ingredients and the other ingredient advantageously added later.

Among polyphosphates capable of effective use for the purposes of the invention are sodium tripolyphosphate, tetrasodium pyrophosphate, sodium hexametaphosphate, sodium tetraphosphate, various quadra phosphates and similar compounds. It should be understood, however, that almost any water soluble polyphosphate will provide the desired result, to a greater or lesser extent.

The exact amount of surface-active mixture, polyphosphate and sulfate in a composition exhibiting the optimum novel and desirable properties of the compositions of the invention will, of course, vary with the particular surface-active agents and materials employed. However, the following proportions when applied to a base mixture of AA and DDBS illustrate the formulations contemplated by the invention.

| Ingredient: | Amount, % |
|---|---|
| Base mixture | 40–55 |
| Ammonium sulfate | 20–30 |
| Water soluble polyphosphate | 30–38 |

When the above ingredients are combined within the ranges given, they will form complete free-flowing clear liquids at all concentrations up to a total solids as high as about 48% at normal temperatures. Although proportions other than those indicated may be used with some success, water softening characteristics are appreciably lost if less than 30% of water soluble polyphosphate is used. Similarly, solubility of the compositions is impaired if less than 20% of ammonium sulfate is employed. In every case however, the cleaning characteristics of aqueous solutions of the above compositions materially exceed those of aqueous solutions of the base mixture, when used alone, or with either the polyphosphate or sulfate individually. Following are tables and data illustrating these characteristics of surface-active compositions and solutions of the invention.

For purposes of comparison aqueous solutions of various concentrations were prepared from a mixture of AA and DDBS (equal proportions by weight), and from such mixture with sodium tripolyphosphate, with ammonium sulfate and with sodium sulfate. City tap water (Long Beach, California) was used in every case. Similar aqueous solutions were also prepared from a preferred composition of the invention, employing 45% by weight of a 1:1 mixture of AA and DDBS, 33% of sodium tripolyphosphate, and 22% of ammonium sulfate. Measurements of surface tensions were then made on a DuNouy Tensiometer at 77° F. with the following results:

*Table I*

| Solids Concentration, Weight Percent | Surface Tension—Dynes per cm. | | | | |
|---|---|---|---|---|---|
| | 100% AA-DDBS | 80% AA-DDBS, 20% Phosphate | 80% AA-DDBS, 20% $(NH_4)_2SO_4$ | 80% AA-DDBS, 20% $Na_2SO_4$ | 45% AA-DDBS, 33% Phosphate, 22% $(NH_4)_2SO_4$ |
| 0.5 | 26.5 | 27.8 | 26.0 | 26.6 | 28.0 |
| 1.0 | 26.7 | 27.5 | 26.7 | 26.8 | 27.4 |

Note that 1% of surfactants (AA–DDBS) gave a surface tension of 26.7: the solution made with the formulated composition (last column) contained less than half the amount of surfactants and still had a low surface tension of 27.4. This indicates a co-operation and interaction between the ingredients of the formulated compositions that is totally unrelated to any proportionate effect of their ingredients.

The mild substantially neutral non-alkaline character of compositions prepared in accordance with the invention, over a wide range of dilutions, is illustrated in Table II. In this table, as in following tables, a preferred formulation employing 45% of a mixture of AA and DDBS, 33% of sodium tripolyphosphate and 22% of ammonium sulfate was evaluated.

Table II

| Solids concentration, Weight percent | pH |
|---|---|
| 0.05 | 7.70 |
| 0.25 | 8.15 |
| 0.5 | 8.15 |
| 2.5 | 8.05 |
| 25.0 | 7.60 |
| 50.0 | 7.45 |

The good buffering action of the surface-active compositions of the invention against alkali is indicated by a relatively small increase in pH as set forth in Table III. In obtaining the data for this table, 4 normal sodium hydroxide was added (2 cc. at a time) to 25 ccs. of a 5% aqueous solution of the preferred composition.

Table III

| Ccs. of 4 N, NaOH added | pH |
|---|---|
| 0 | 8.05 |
| 2 | 8.97 |
| 4 | 9.4 |
| 6 | 9.71 |
| 8 | 10.12 |
| 10 | 10.85 |

Wetting speeds determined for the preferred composition are indicated in Table IV. The conventional Draves test was employed using a 3 gram hook.

Table IV

| Concentration of solids, Weight percent | Time in seconds |
|---|---|
| 1.0 | 6 |
| 0.5 | 19 |
| 0.25 | 180 |

Determinations of foam were also made in the conventional Ross Miles Apparatus at different concentrations of the surface-active compositions. These results are set forth in Table V.

Table V

| Concentration of Solids, Weight % | 0 Min. | Centimeters Foam | |
|---|---|---|---|
| | | 1 Min. | 5 Mins |
| 0.05 | 10.6 | 8.7 | 8.2 |
| 0.1 | 14.5 | 12.6 | 11.6 |
| 0.2 | 19.0 | 16.6 | 16.3 |
| 0.5 | 20.3 | 17.9 | 17.7 |
| 1.0 | 21.0 | 18.4 | 18.0 |

Interfacial tension against a medical mineral oil (NUJOL) was also determined on the preferred composition, measurements again being obtained with a DuNouy Tensiometer at 77° F. These results are set forth in Table VI.

Table VI

| Concentration of solids, Weight percent | dynes/cm. |
|---|---|
| 0.05 | 10.6 |
| 0.1 | 3.1 |
| 0.2 | 7.4 |
| 0.5 | 7.6 |
| 1.0 | 10.6 |

The above examples illustrate clearly by conventional tests the improved surface-active characteristics and detergency of formulations according to the present invention. However, these tests in no way indicate the amazing versatility of the new surface-active compositions of the invention. For example, at concentrations of 1–2 ounces per gallon the compositions may be successfully used for almost any household cleaning activity, such as washing dishes, windows, linoleum, woodwork, tile, toilets, tubs or general laundry use, replacing the multitude of special purpose compositions normally employed. At a concentration of about 1 ounce per wash basin of warm water, the compositions provide excellent results with the handwashables, woolens, silks, nylons, etc., without any harmful effects as a result of undesirable alkalinity. More striking, perhaps, is the unexpected usefulness of the compositions in a wide variety of seemingly divergent industrial application. Thus, at concentrations of about 10 to 20 ounces per gallon, the compositions of the invention provide excellent results in dip-tank stripping operations, removing enamel from glass in one to three hours at room temperatures, for example. Metal cleaning operations can be performed with similar success, rust and corrosion being quickly removed from iron, steel and the like. Grease, oil, tars, paint and other such resinous and gummy substances may likewise be removed from metal surfaces, while removal of tarnish from copper or silver products occurs very rapidly (10 to 16 minutes). Detinning of steel can be accomplished at relatively low concentrations, (4 to 5 ounces per gallon). The compositions of the invention may also be used in burnishing or polishing compounds, in dry form, or in solution depending upon the application; for example, the compositions are quite useful in the dry rouges customarily used in glass polishing, and in solutions employed in the high speed polishing of glass by means of an abrasive wheel. It may be noted that the compositions of this invention are free from non-aqueous solvents, kerosene or other petroleum hydrocarbons. The compositions are particularly effective in the cleaning of aluminum due to their substantial nonalkalinity, contrasting the persistent and continued corrosive effect caused by inclusion of alkali in cracks, fissures and the like occuring with conventional high alkaline cleaners. A further advantage of the surface-active compositions of the invention resides in their tendency to inhibit the corrosive effects of water to all common metals so that only slight corrosive effects, if any, are observed.

It may be noted that the formulated cleaning composition of this invention may be used with a small proportion of a high ionic detergent or an amide; such addition appears to improve the fluffiness and hand of fabrics washed therewith. Although the formulated compound will readily emulsify vegetable and mineral oils, it will not do so to many glycols and alcohols.

To those skilled in the art to which this invention relates, widely different procedures, embodiments and application of the invention will suggest themselves without departing from the spirit and scope of the invention. The disclosures and the description herein are purely illustrative and are not intended to be in any sense limiting.

I claim:

1. A composition having enhanced cleaning and detergent and water-softening properties consisting essentially of, on a dry weight basis: (a) from 40 to 55 parts of a mixture of (1) an alkyl aryl sulfonate normally incapable of forming solutions and true liquids at concentrations of above about 2 to 10% in water, and (2) an alkali metal sulfonate of mixed hydrocarbons substantially comprising alpha and beta methyl naphthalenes and dimethyl naphthalenes, said alkali metal sulfonate being virtually free from olefins and constituting from 40 to 70% of said mixture; (b) from 30 to 38 parts of a water-soluble polyphosphate, and (c) from 20 to 30 parts of an ammonium sulfate; said composition being adapted to form water solutions at all concentrations up to about 48% of said solids at normal temperatures, detergent properties of said composition materially exceeding the detergent properties of the said mixture when used alone.

2. The composition of claim 1 wherein the average molecular weight of said mixed hydrocarbons falls within the range between about 230 and 275.

3. The composition of claim 1 wherein said alkyl aryl sulfonate is sodium dodecyl benzene sulfonate.

4. A composition having enhanced cleaning and detergent and water-softening properties consisting essentially of, on a dry weight basis: 40 to 55 parts by weight of a mixture of between 3 and 6 parts of sodium dodecyl benzene sulfonate and between 4 and 7 parts of an alkali metal sulfonate of mixed hydrocarbons substantially comprising alpha and beta methyl naphthalenes and dimethyl naphthalenes; 30 to 38 parts of a water-soluble polyphosphate; and 20 to 30 parts of ammonium sulfate; said composition being adapted to form water-solutions at all concentrations up to about 50 to 55% of said solids, detergent properties of said composition materially exceeding the detergent properties of the sulfonates when used alone.

5. A free-flowing substantially non-alkaline aqueous solution useful as a surface-active agent, cleanser and detergent and characterized by water-softening properties and a relatively low viscosity, consisting essentially of: at least 15% of an alkyl aryl sulfonate normally incapable of forming solutions and true liquids at concentrations above about 2 to 10%, at least 20% by weight of an alkali metal sulfonate of mixed hydrocarbons substantially comprising alpha and beta methyl naphthalenes and dimethyl naphthalenes, from 30 to 38% of a water soluble polyphosphate, from 20 to 30% of ammonium sulfate, on a dry basis, and water sufficient to make a liquid solution of desired concentration.

6. A composition having enhanced cleaning and detergent and water-softening properties consisting essentially of, on a dry weight basis: 40 to 55 parts by weight of a mixture of between 3 and 6 parts of sodium dodecyl benzene sulfonate and between 4 and 7 parts of an alkali metal sulfonate of mixed hydrocarbons substantially comprising alpha and beta methyl naphthalenes and dimethyl naphthalenes; 30 to 38 parts of water-soluble alkali metal polyphosphate; and 20 to 30 parts of ammonium sulfate; said composition being adapted to form water-solutions at all concentrations up to about 50 to 55% of said solids, detergent properties of said composition materially exceeding the detergent properties of the sulfonates when used alone.

7. A composition having enhanced cleaning and detergent and water-softening properties consisting essentially of, on a dry weight basis: 40 to 55 parts by weight of a mixture of between 3 and 6 parts of sodium dodecyl benzene sulfonate and between 4 and 7 parts of an alkali metal sulfonate of mixed hydrocarbons substantially comprising alpha and beta methyl naphthalenes and dimethyl naphthalenes; 30 to 38 parts of sodium tripolyphosphate; and 20 to 30 parts of ammonium sulfate; said composition being adapted to form water-solutions at all concentrations up to about 50 to 55% of said solids, detergent properties of said composition materially exceeding the detergent properties of the sulfonates when used alone.

References Cited in the file of this patent

UNITED STATES PATENTS

| | | |
|---|---|---|
| 2,184,171 | Sponsel | Dec. 19, 1939 |
| 2,477,383 | Lewis | July 26, 1949 |
| 2,615,847 | Thompson | Oct. 28, 1952 |
| 2,733,214 | Vitale et al. | Jan. 31, 1956 |
| 2,781,321 | Mayhew et al. | Feb. 12, 1957 |

OTHER REFERENCES

Ind. and Eng. Chem. (March 1943), vol. 35, No. 3, pages 306–312.

"Surface Active Agents" by Schwartz and Perry, 1949, pages 116–117.